Aug. 18, 1959  P. A. COFFMAN, JR., ET AL  2,900,110
GRAVIMETRIC SCREW TYPE FEEDERS AND WEIGHERS
Filed Oct. 18, 1954  6 Sheets-Sheet 1

INVENTOR.
LYNDUS E. HARPER
PAUL A. COFFMAN JR.
BY
Alfred R. Fuchs
ATTORNEY Aug. 18, 1959   P. A. COFFMAN, JR., ET AL   2,900,110
GRAVIMETRIC SCREW TYPE FEEDERS AND WEIGHERS
Filed Oct. 18, 1954   6 Sheets-Sheet 4

INVENTORS.
LYNDUS E. HARPER
BY PAUL A. COFFMAN JR.

*Alfred R. Fuchs*
ATTORNEY

Aug. 18, 1959 P. A. COFFMAN, JR., ET AL 2,900,110
GRAVIMETRIC SCREW TYPE FEEDERS AND WEIGHERS
Filed Oct. 18, 1954 6 Sheets-Sheet 5

INVENTORS.
LYNDUS E. HARPER
PAUL A. COFFMAN JR.
BY
Alfred R. Fuchs
ATTORNEY

United States Patent Office

2,900,110
Patented Aug. 18, 1959

2,900,110

GRAVIMETRIC SCREW TYPE FEEDERS AND WEIGHERS

Paul A. Coffman, Jr., Warwick, and Lyndus E. Harper, West Barrington, R.I., assignors, by mesne assignments, to B-I-F Industries, a corporation of Rhode Island Application October 18, 1954, Serial No. 462,863

17 Claims. (Cl. 222—55)

Our invention relates to gravimetric feeders and weighers, and more particularly to gravimetric screw type feeders and weighers.

Our invention relates to a feeding and weighing device that comprises a pair of horizontally elongated housings, one of which is connected at its inlet end with a hopper from which material is received into the same, and the other of which receives the material from the opposite end of the first mentioned housing at one end thereof and discharges the material therefrom at the other end thereof, said housings being flexibly connected with each other, the first mentioned housing being mounted in stationary position and the second mentioned housing being mounted for limited up and down movement about a transverse axis, said housings having conveying means therein for moving material lengthwise thereof so that the material is transported lengthwise of said housings from the hopper through said first mentioned housing into the second mentioned housing and discharged from said second mentioned housing to any suitable device to which the material is being fed, said second mentioned housing serving as a portion of weighing means for the material that is passing through the same.

More specifically our invention comprises a pair of tubular housings arranged end to end and connected together in the above referred to manner, each having a conveyor screw therein, said conveyor screws being disconnected from each other to permit the up and down movements of the tubular housing that comprises a portion of the weighing means, said last mentioned tubular housing being connected with a scalebeam that comprises a part of the weighing means so as to be supported therefrom.

Our invention is capable of use merely as a weighing device to weigh the material flowing through the housing that is part of the weighing apparatus, and which may be referred to as the weighing housing as distinguished from the stationary or feeding housing, or as a feeder in which the rate of feed is controlled by the weighing means that comprises the weighing housing and parts carried thereby and the conveyor contained therein, as well as the scale having the scalebeam above referred to.

In adapting our invention for use as a feeding device in which the rate of feed is controlled by the weight of the material that is being fed, the feed screw in the weighing housing is driven at a uniform speed by a suitable driving means and the feed screw in the feeding housing leading from the hopper is operated at a variable speed, dependent upon the adjustment of suitable variable speed driving means which is controlled by a suitable controlling device that is connected with the scalebeam in such a manner that the controlling device is responsive to the position of the scalebeam. Thus the position of the scalebeam serves to actuate the controlling means to adjust the variable speed drive to increase the speed of the feed screw in the feeding housing when the scalebeam is raised above its balanced position due to the weight of the material passing through the weighing housing being less than that desired, while when the position of the scalebeam is below the balanced position due to the weight of the material in the weighing housing being greater than that desired, the controlling means adjusts the variable speed driving means responsive to the position of the scalebeam to decrease the rate of rotation of the feed screw to reduce the amount of material that is being fed to the weighing housing. When the scalebeam is in its balanced position the controlling device is not affected so that the adjustment of the variable speed driving means for the feed screw in the feeding housing is not changed from that which at that time exists.

In order to provide a weighing means that will be readily responsive to the amount of material in the weighing housing, said housing is so mounted as to be supported from the scalebeam and to have freedom of movement in an up and down direction about a transverse horizontal axis, the weighing housing being mounted flexibly at its discharge end and having a flexible connection with the feeding housing in order that such movement can take place, and the driving means for the screw conveyor in the weighing housing being provided with a universal joint lying substantially on the axis about which said housing is adapted to swing so that the driving means does not interfere with the up and down movements of the weighing housing.

Other objects and advantages of our invention will appear as the description of the drawings proceeds. We desire to have it understood, however, that we do not intend to limit ourselves to the particular details shown or described, except as defined in the claims.

Figures 8, 9, 10:
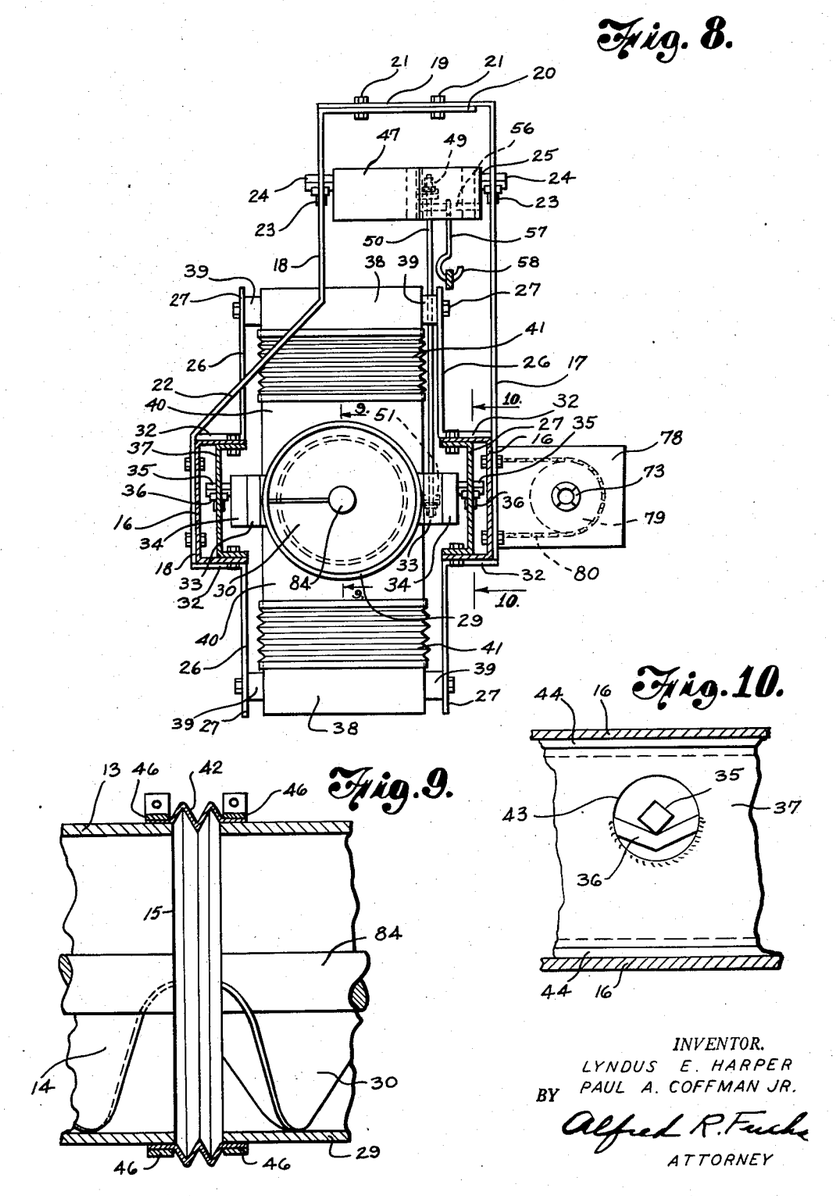
Fig. 8 is a vertical sectional view, on an enlarged scale, taken substantially on the line 8—8 of Fig. 3.
Fig. 9 is a fragmentary, section on an enlarged scale, taken on the line 9—9 of Fig. 3.
Fig. 10 is a fragmentary section on an enlarged scale, taken on the line 10—10 of Fig. 8.

Referring in detail to the drawings, our improved weighing and feeding device is shown as being connected with a hopper 10 that is mounted on a suitable base 11 and which has a bottom portion 12 to which a tubular housing 13 is rigidily connected and from which bottom portion said housing extends substantially horizontally. Mounted in said bottom portion 12 of said hopper 10 is a screw conveyor 14, (see Fig. 3), which extends into the tubular housing 13 and lengthwise thereof, said screw conveyor 14 fitting said housing so as to serve, in cooperation with the housing 13, to move material lengthwise thereof from the bottom portion 12 of the hopper toward its discharge end 15. Suitable frame members 16 extend from the bottom portion 12 in a substantially horizontal direction parallel to the axis of the housing 13 and mounted on said longitudinally extending frame members 16 are upstanding frame members 17 and 18 that are connected together by transversely extending portions 19 and 20 by means of bolts 21, (see Fig. 8), to provide a support for the weighing means on the frame. In order to position the scalebeam of the weighing means to one side of the housing members in which the conveying means is provided for the material that is to be weighed, the one frame member 18 is provided with an inclined portion 22 so as to offset the upper portion thereof from the one frame member 16. Mounted on the frame members 17 and 18 are suitable fulcrum members 23 for the knife edge members 24 about which the scalebeam 25 swings.

Also mounted on the extremity of the frame members 16 remote from the hopper are brackets 26 which have horizontally extending upper portions 27 and lower portions 28 that serve as mounting means for the one end of the weighing housing 29. Said end of the weighing housing is flexibly mounted on the upper and lower arms 27 and 28 of the brackets 26 by a suitable flexible connection, which will be described below. The weighing housing 29 is also provided with a screw conveyor 30, which extends lengthwise thereof and fits said housing closely, and said housing 29 is mounted to swing about a transverse axis at the end thereof that is connected with the housing 13.

The brackets 26 have outwardly offset portions 31 extending along the outer faces of the frame members 16 and secured thereto, transverse portions 32 thereof extending along the top and bottom of said frame members 16. The inlet end of the housing 29 is provided with bracket members 33, (see Figs. 3 and 8), that have outwardly offset extensions 34 thereon, on which the outwardly projecting knife edged pivot members 35 are rigidly secured. Said knife edged members 35 are mounted to rock on fulcrum members 36 provided on the frame members 37 mounted on the frame members 16, (see Figs. 3 and 10), suitable openings 43 being provided in the web portions of said frame members 37 for said fulcrums and knife edged members, and suitable filler members 44 being provided between the flanges of the channels 16 and 37.

Mounted on the portions 27 of the brackets 26 are the rigid rectangular upper and lower housing portions 38, which are spaced from the bracket portions 27 by means of the spacing members 39. The housing 29 has the upstanding housing portion 40 rigidly secured thereto, said housing portion 40 being rectangular and having an opening 45 therein, (see Fig. 11), of the full diameter of the housing 29 for passage of material from the tubular housing 29 into the upstanding housing portion 40. The housing portion 40 is flexibly connected with the housing portions 38 by means of accordion-like walls 41 of flexible material of a suitable character secured to said members 38 and 40. The end of the tubular housing 29 adjacent the housing 13 is connected therewith by a tubular accordion-like wall 42 of similar material to provide a flexible connection between the adjacent ends of the housings 13 and 29, (see Figs. 1, 3 and 9). The flexible accordion-like members 41 and 42 are secured to the housing portions 13, 29, 38 and 40 by suitable clamping rings, such as illustrated at 46 in Fig. 9.

Figures 1, 11:
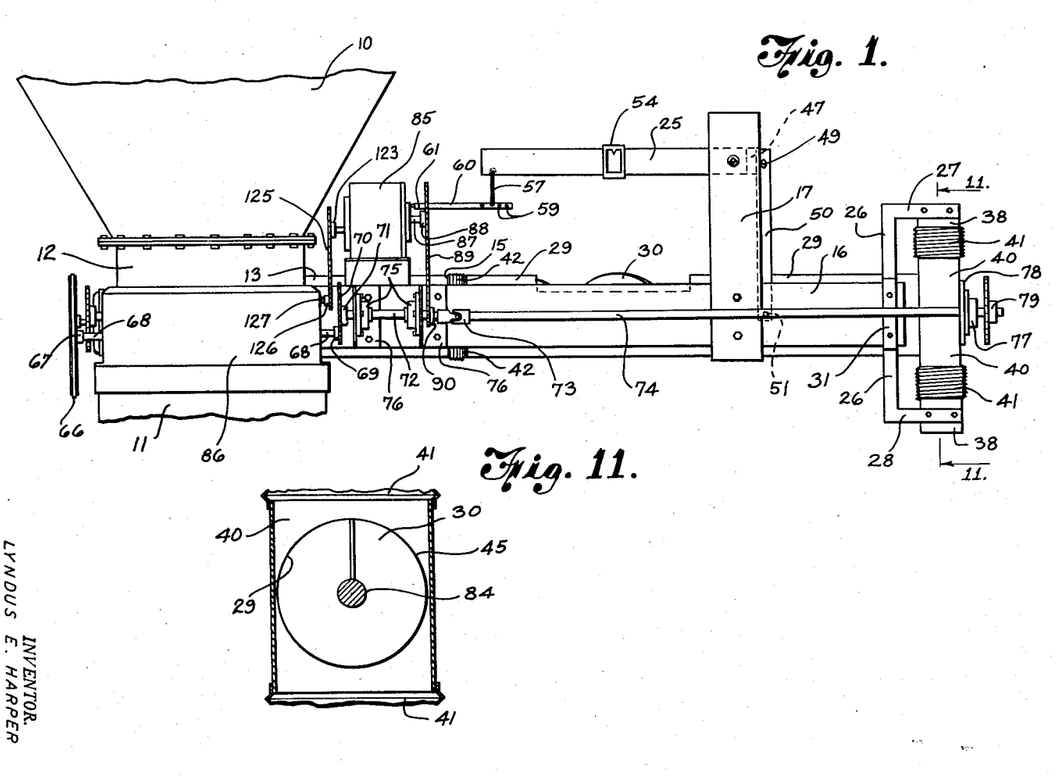
Fig. 1 is a view in side elevation of our improved weighing and feeding apparatus, showing a fragmentary portion of a hopper with which it is connected.
Fig. 11 is a fragmentary section taken on the line 11—11 of Fig. 1.
Figure 2:
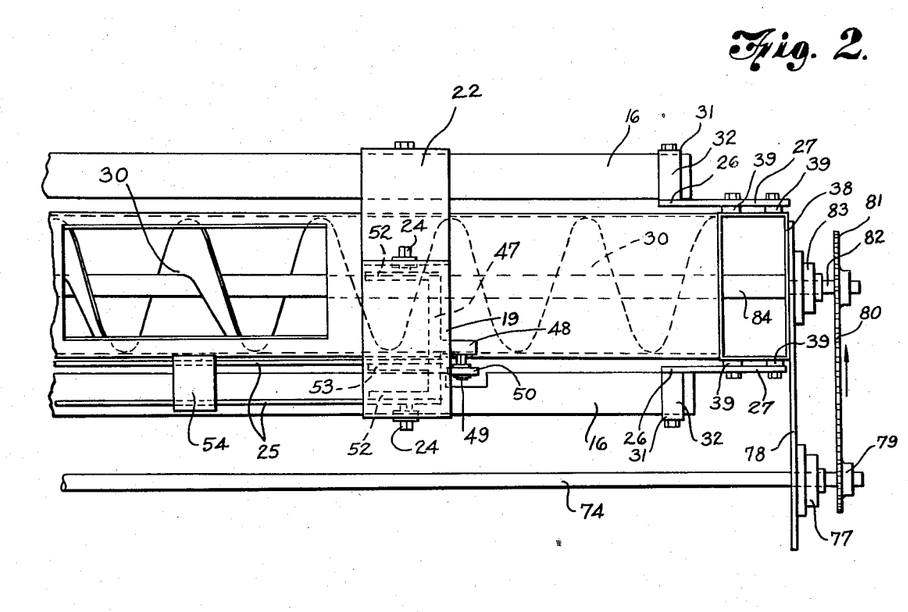
Fig. 2 is a fragmentary top plan view, on an enlarged scale, of the weighing housing and associated parts, the end of said weighing housing adjacent the feeding housing being broken away.

The scalebeam 25 has a bracket 47 fixedly mounted thereon in any suitable manner, (see Figs. 1 and 2). Said bracket has a flange 48 projecting therefrom that is provided with a knife edge member 49 extending from one side thereof. A bar 50 is provided with a fulcrum member, similar to the fulcrum member 36, for suspending the bar 50 from the knife edge member 48 at its upper end. The lower end of the bar 50 is also provided with a fulcrum member with which a knife edge member 51, (see Fig. 1), that projects rigidly from the housing 29 cooperates to suspend the housing 29 from the bar 50 and thus from the scalebeam, the housing 29 thus being pivotally mounted to swing about the lower knife edges on the members 35 in accordance with the movements of the scalebeam 25. It is to be understood, of course, that all of the fulcrum members are so made that the knife edge members cooperating therewith are free to rock about the knife edges thereof cooperating with said fulcrum members. The fulcrum members 23 are made in a similar manner to the fulcrum members 36 and the knife edge members 24 are similar to the knife edge members 35. Said knife edge members 24 are rigidly mounted on the flanges 52 of the bracket 47, as will be obvious from Fig. 2.

The flexible connections at 41 and 42 are of such a character that the movements that the housing 29 will have in response to the movements of the scalebeam 25 will not be in any manner interfered with by these flexible connections. The scalebeam 25 is made up of pair of bars each of which is mounted on a flange of the bracket 47, one thereof being mounted on the flange 52 and the other on the flange 53. Straddling said bars 25 and slidable thereon is a counterpoise or weight 54. At the opposite end of the scalebeam 25 from the bracket 47 is a transverse pivot pin 55, (see Fig. 3). In order that the bars 25 be held in uniformly spaced relation throughout the length of the scalebeam, a cross connection 56 is provided at the end thereof opposite that to which the same are secured in any suitable manner, as by welding, to the flanges 52 and 53 of the bracket 47.

An elongated hook 57 is pivotally mounted on the pivot pin 56 and has a hook 58 formed on the lower end thereof, which engages in an opening 59 in a bar 60, there being a row of said openings 59 provided for adjustment of the connection thus provided between the scalebeam and the bar 60 at the end of the scalebeam opposite that having the bracket 47. The bar 60 is L-shaped in character, having a leg 61 that extends at right angles to the portion thereof that is secured to the hook 57, the portion 61 of said bar 60 having a shaft 62 fixed thereto as by means of a set screw 63, (see Figs. 3 and 4). It will accordingly be obvious that the shaft 62 will rock as the scalebeam 25 moves up and down. The shaft 62 is a part of a controlling device for controlling the rate of rotation of the feed screw 14 in a manner to be described below.

Figure 3:
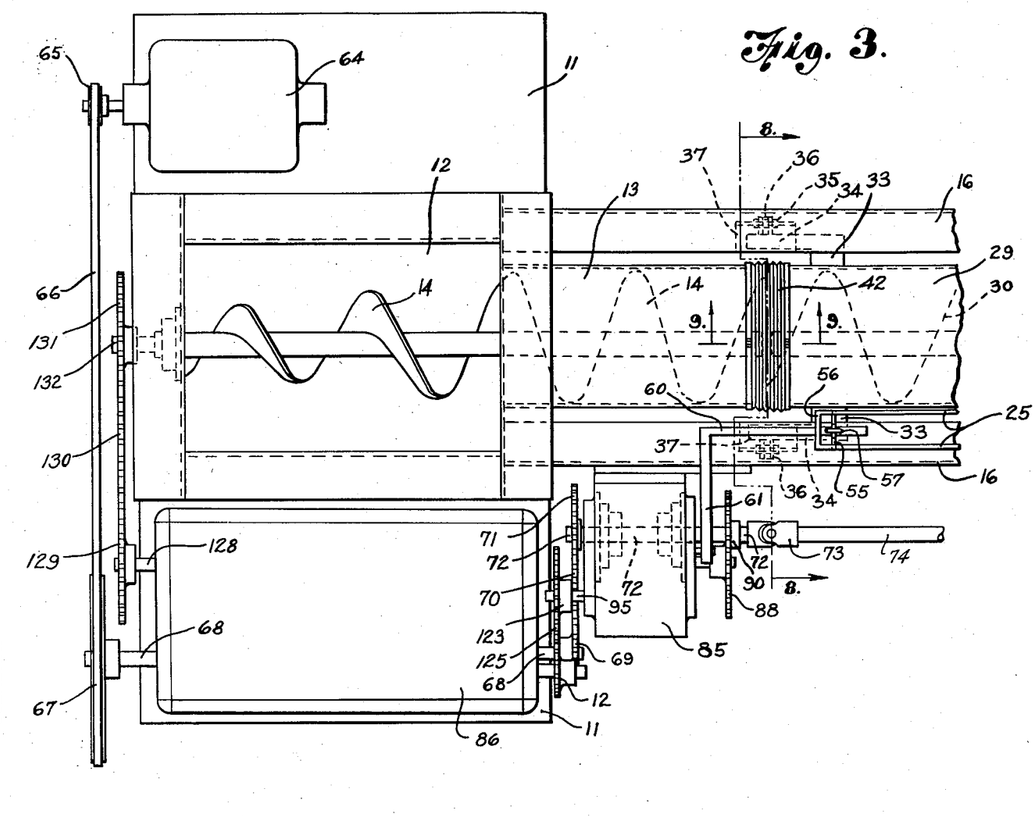
Fig. 3 is a top plan view, on an enlarged scale, of the hopper and the feeding housing and a fragmentary portion of the weighing housing, the conveying means and driving means therefor being partly broken away.

Referring to Figs. 1 and 3, on the base 11 is a motor 64, which is provided with a pulley 65 over which the belt 66 operates, that drives a pulley 67 mounted on a shaft 68 to rotate therewith. The shaft 68 is mounted in suitable bearings on the base 11 and has a sprocket 69 mounted thereon to rotate therewith, over which the sprocket chain 70 operates, said sprocket chain 70 also operating over a sprocket 71 that is fixed to the shaft 72 to rotate therewith. Said shaft 72 is connected by means of a universal joint 73 with the shaft 74. The shaft 72 is mounted in suitable bearings 75 that are mounted on brackets 76 on the one frame member 16. Said shaft 74 is also mounted in a suitable bearing 77 (see Figs. 1 and 2), on a bracket 78 extending from the upstanding housing portion 40. Thus the shaft 74 is mounted to swing with the housing portion 29 and said universal joint is mounted substantially on the pivot axis provided by the knife edge trunnion members 35 and fulcrum members 36.

The shaft 74 has a sprocket 79 fixed thereon to rotate therewith, over which the sprocket chain 80 operates, which also operates over a sprocket 81 which is fixed to the shaft 82, which shaft is mounted in a suitable bearing 83 provided on the upstanding housing portion 40, said shaft 82 being an extension of the central shaft portion 84 of the screw conveyor 30. It will be noted that the spiral blade portion of the screw conveyor 30 terminates short of the central shaft portion 84 thereof extending only substantially to the housing 40. The spiral blade portion of the screw conveyor 30 fits closely in the housing 29 and no bearing is provided therefor at the end thereof adjacent the housing 13.

It will accordingly be noted that the screw conveyor 30 will rotate at a constant rate and will thus deliver at a constant rate the material that is supplied thereto by the screw conveyor 14, and that the operation thereof will continue at a uniform rate no matter what the position of the scalebeam 25 may be. However, the rate at which the material is supplied to the conveyor 30 will vary in accordance with the position of the scalebeam, as will be described below. Due to the fact that the pulley 65 is relatively small as compared with the pulley 67 and the sprocket 69 is relatively small as compared with the sprocket 71 the rate of rotation of the shaft 74 will be only a fraction of the rate of rotation of the shaft of the motor 64, and accordingly the screw conveyor 30 will rotate at a relatively slow rate. It will also be obvious that the scales will weigh the material that is passing through the conveyor section 29 continuously as the weight of all of the parts of the apparatus associated with said screw conveyor 30 and housing 29 will remain constant. If desired, the apparatus may feed the material that is being weighed to suitable apparatus that may be located below the lower housing portion 38 into any suitable container that may be provided therebelow, and also, if it is desired to add material to that being fed out of the lower housing portion 38 it can be fed in through the upper housing portion 38 without in any manner interfering with the operation of the weighing means.

The controlling device 85 (see Figs. 1 and 3), for the variable speed transmission 86, of the general type shown in the patent to Harper, 2,404,231, July 16, 1946, has a shaft 87, which has a sprocket 88 mounted thereon to rotate therewith, over which the sprocket chain 89 operates, that operates over a sprocket 90 on the shaft 72. It will be noted that the sprocket 90 is relatively small with respect to the sprocket 88, and accordingly the shaft 87 rotates at a uniform speed along with the shaft 72 but at a slower rate than said shaft 72.

Figure 4:
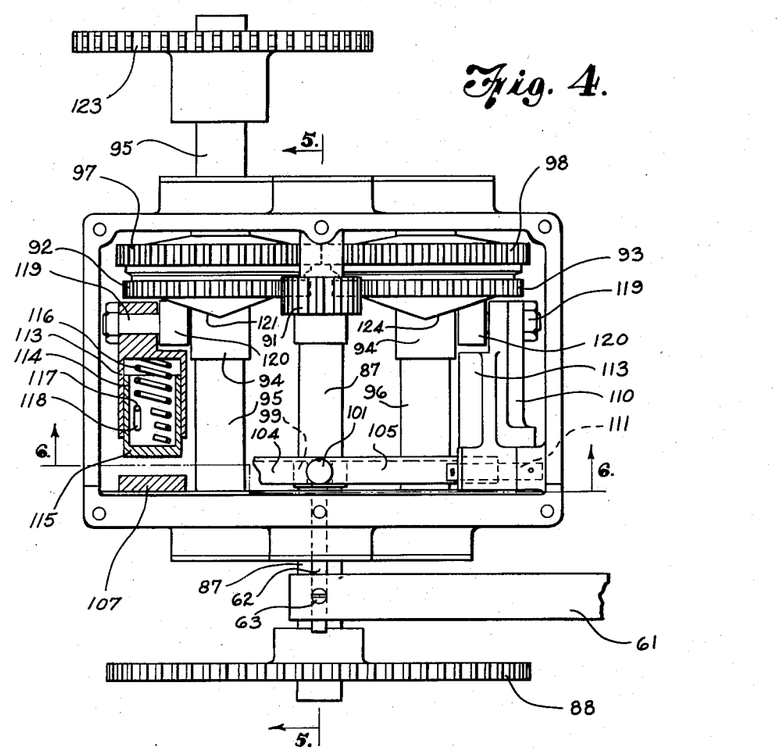
Fig. 4 is a top plan view, on an enlarged scale, of the controlling device for the variable speed driving means, with the cover plate removed, a portion thereof being in section.
Figure 5:
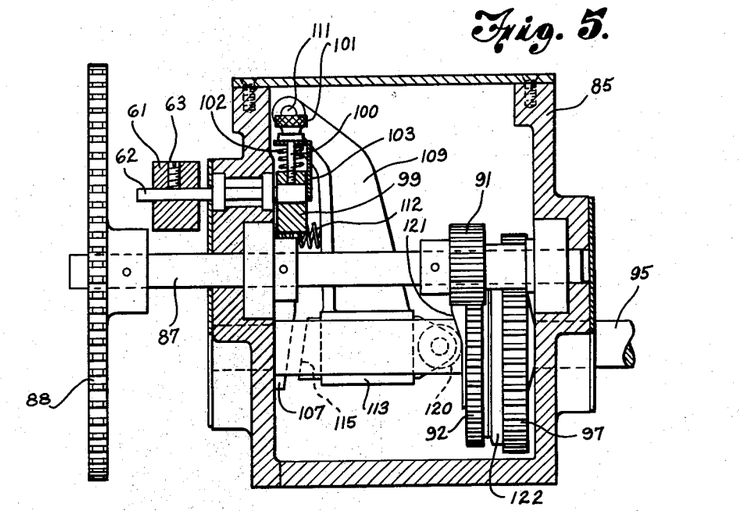
Fig. 5 is a section taken on the line 5—5 of Fig. 4, certain parts being shown in elevation therein.
Figure 6:
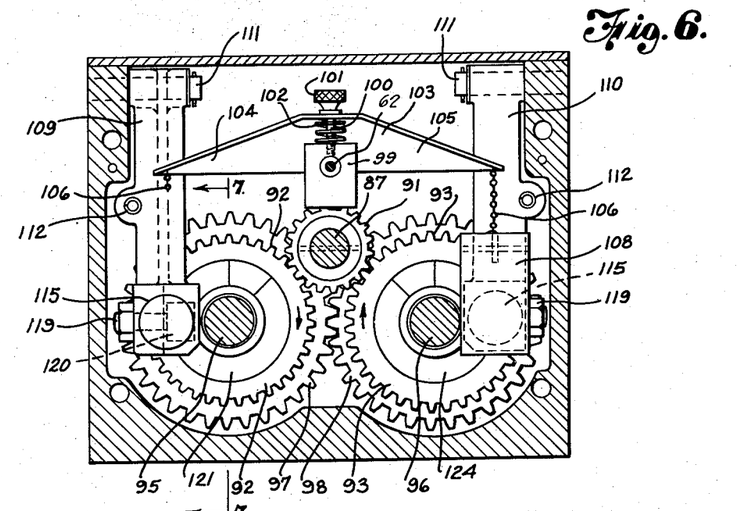
Fig. 6 is a section taken on the line 6—6 of Fig. 4.
Figure 7:
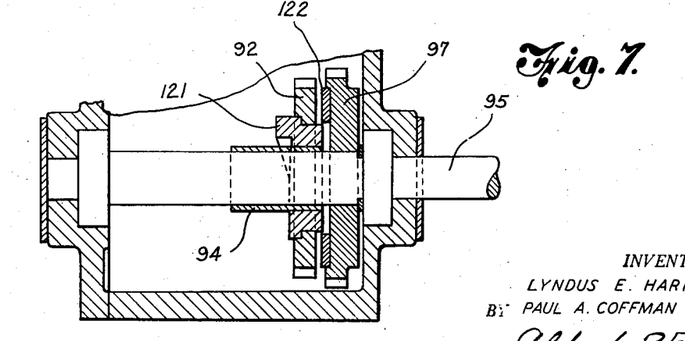
Fig. 7 is a fragmentary vertical sectional view taken on the line 7—7 of Fig. 6.

Referring to Figs. 4, 5 and 6, said shaft 87 has a gear 91 fixed thereto that meshes with the gears 92 and 93 that are mounted on the sleeves 94 on the shafts 95 and 96, respectively. It will accordingly be obvious that the gears 92 and 93 rotate in the same directions on the shafts 95 and 96. Said gears 92 and 93 are also endwise slidable on the shafts 95 and 96. A gear 97 is mounted coaxially with the gear 92 and is fixed to the shaft 95. A gear 98 meshes with the gear 97 and is freely rotatably mounted on the shaft 96.

Mounted on the shaft 62 to rock with said shaft is a block 99, a bolt 100 being mounted in the block 99, extending upwardly therefrom and having a knurled head 101 thereon for adjustment thereof in the block 99. A compression spring 102 is mounted between the block 99 and a sheet metal lever 103 similar to a walking beam having the arms 104 and 105 extending in opposite directions from the shaft 62. Suspended by means of flexible members, such as chains 106, from the outer ends of the arms 104 and 105 are the wedges 107 and 108. Levers 109 and 110 are pivoted at their upper ends on pivots 111 that are provided on the housing of the controlling member 85. Said levers are urged toward the right in Fig. 5 by means of springs 112 mounted between the same and a wall of said housing. On the lower ends of each of said levers is provided a cylindrical housing 113 within which a tubular member 114 having an end wall 115 is telescopically mounted, a coil spring 116 being provided in the telescopically mounted members so as to tend to move the member 114 to an extended position, the movement thereof being limited by a pin 117 engaging in a slot 118.

When the shaft 62 is in the position shown in the drawings, which is that in which the scalebeam 25 is in a balanced position, the lever 103 will be horizontally disposed, that is, the arm 104 and the arm 105 thereof will be horizontally opposite each other and the wedges 107 and 108 will be in a middle raised position where these have no effect on the operation of the gears 97 and 98. The wall 115 is inclined, as will be obvious from Fig. 5 and when the wedging member 107 is moved downwardly the inclined face of said wedging member will be adjacent the inclined wall 115 of the member 114 in such position that movement of the lower end of the lever 109 toward the left in Fig. 5 will cause the wall 115 to engage the member 107.

A bolt-like member 119 is mounted in a forward projection on the lower end of the lever 109 and has a roller 120 rotatably mounted thereon that is of a cylindrical character and which engages a cam 121 provided on the gear between the outer portion of said gear and the sleeve 94. This causes the lower end of the lever 109 to move to the left in Fig. 5, which movement is resisted by engagement of the wall 115 with the wedge 107 and, as 116 is a strong spring, roller 120 riding upon the cam 121 will cause the gear 92 to move toward the gear 97. The gears 92 and 97 act as a clutch device, a lining of friction material 122 being provided in a recess in the face of the gear 97 directed toward the opposed face of the gear 92. This will cause the gear 97 to rotate in the same direction as the gear 92 for the interval that the roller 120 is in engagement with the raised portion of the cam 121 and the wall 115 is in engagement with the wedge 107. This causes rotation of the shaft 95 for an interval dependent upon the amount that the lever 103 is out of horizontal position and a corresponding rotational movement of the sprocket 123.

A roller 120 is similarly mounted on the lever 110 and is adapted to engage in a similar manner with the cam 124 on the gear 93 to move it into engagement with the gear 98, this occurring when the wedging member 108 is lowered due to the arm 105 of the lever 103 being swung downwardly. When this takes place the gear 98, which may be rotatable on its shaft, is rotated in the same direction as the gear 93, but in meshing with the gear 97 it rotates the gear 97 in the opposite direction to that in which it has been rotated by engagement of the gear 92 therewith through the clutch lining 122, and the amount of rotation of the shaft 95 in the opposite direction will be dependent upon the amount of tilt of the arm 105 on the lever that carries the wedge 108.

It will accordingly be seen that the shaft 97 and the sprocket 123 will be rotated in opposite directions dependent upon the direction in which the lever 103 is rocked by means of the leg 61 of the bar 60. The leg 61 of the L-shaped bar will cause the shaft 62 to be rocked in a direction to lower the arm 105 thereof when the end of the scalebeam 25 having the bar 60 connected therewith moves downwardly below balanced position and the arm 104 thereof will be lowered when the end of the scalebeam 25 to which said bar 60 is connected rises.

The sprocket 123 has a sprocket chain 125 operating over the same, (see Fig. 1), which operates over a sprocket 126 fixed on the adjusting shaft 127 of the variable speed device 86. The connection between the controlling device 85 and the variable speed device 86 through this adjusting means is such that when the scalebeam 25 is raised at the end thereof that has the bar 60 thereon, which would be the case when a greater amount of material is being conveyed through the housing 29 than is desired for the rate of feed at which the device is to be operated, the sprocket 126 and the adjusting shaft 127 are rotated in the proper direction to adjust the variable speed mechanism to reduce the rate of rotation of the output shaft thereof. The output shaft 128 of the variable speed drive 86 has a sprocket 129 fixed thereto that has a sprocket chain 130 operating over the same that operates over a sprocket 131 that is fixed on the shaft 132 that rotates with the feed screw 14, a suitable bearing being provided for the left hand end of the shaft 132 as viewed in Fig. 3, on the bottom portion 12 of the hopper. The end of the feed screw 14 that is in the housing 13 does not have any bearing provided therefor, as it fits with sufficient closeness in the housing 13 that no bearing for that end thereof is necessary.

In operation, the feed screw 14 feeds the material from the hopper 10 into the housing 13 and lengthwise thereof to discharge the material into the end of the housing 29 adjacent the housing 13. The material that is in the housing 29 is weighed continuously by the weighing means comprising the scalebeam 25 due to the fact that the housing 29, the material therein and the parts carried thereby are suspended by means of the member 50 from the scale beam and are free to move up and down with the scale beam due to the mounting of the housing 29 on the knife edge provided by means of the members 35 operating in the fulcrum members 36 and the flexible connection 42 between the housings 13 and 29 and the flexible connections 41 between the housing portions 38 and 40. If desired, the apparatus as herein described can be operated merely as a weighing means, suitable beans being provided for totaling the weight of material that has passed through the housing portion 29 during the operation of the machine.

However, in the embodiment shown, means for controlling the feed of the material is also provided, which has been described, which is controlled by the movements of the scalebeam, and is thus dependent on the weight of material that is being conveyed through the housing section 29. Said means comprises the bar 60 having the leg 61, which bar is suspended from the scalebeam and responds to movements of the scalebeam to rock the shaft 62 to which said leg 61 of the bar is fixed so as to operate the controlling means to move the sprocket 123 in such a direction about its axis of rotation as to adjust the variable speed drive 86 and thus through the adjustment of the variable speed drive control the rate of rotation of the feed conveyor screw 14 to either increase or decrease its rate of rotation, dependent upon whether the scalebeam has lowered at the end at which the hook 57 is provided or raised responsive to the amount of material being conveyed through the conveyor section 29.

What we claim is:

1. In a feeding device, a horizontally elongated housing having an open end providing an inlet in one end thereof and having an outlet at the other end thereof, means for mounting said housing for limited up and down movement about a fixed transverse axis at its inlet end including fixed fulcrum means transversely aligned with the inlet end of said housing supporting the same, and means for limiting up and down movement of said housing at its outlet end, conveying means for supplying loose material to said housing endwise through said inlet, rotatable means within said housing for continuously positively moving said material lengthwise thereof from said inlet toward said outlet, means for rotating said last mentioned means at a constant rate, means for continuously weighing the material in said housing comprising a scalebeam and means connecting said housing between the ends thereof with said scalebeam, and means controlling the rate of feed of said conveying means for supplying said material responsive to said weighing means.

2. In a feeding device, a horizontally elongated open ended tubular housing, said open ends providing an inlet in one end thereof and an outlet at the other end thereof, means for mounting said housing for limited up and down movement, means for supplying loose material to said housing at said inlet, comprising an open ended tubular member extending endwise from the inlet open end of said housing and conveying means in said tubular member discharging material endwise of said tubular member through said inlet open end of said housing, a conveyor screw in said housing moving said material lengthwise thereof from said inlet toward said outlet, means for driving said conveyor screw at a uniform rate, and means for continuously weighing the material in said housing comprising a scalebeam and means connecting said housing between the ends thereof with said scalebeam.

3. In a feeding device, a horizontally elongated housing having an open end providing an inlet in one end thereof and having an outlet at the other end thereof, means for mounting said housing for limited up and down movement including fulcrum means transversely aligned with the inlet end of said housing and flexible members at opposite ends thereof, means disposed endwise with respect to said housing for supplying loose material to said housing through said open end of said housing, means within said housing for continuously positively moving said material lengthwise thereof from said inlet toward said outlet at a uniform rate, and means for continuously weighing the material in said housing comprising a scalebeam and means connecting said housing between said inlet and outlet with said scalebeam.

4. In a feeding device a hopper, a horizontally elongated housing having an inlet in one end thereof and an outlet at the other end thereof, positive, variable rate feeding means for supplying material from said hopper through said inlet, means for mounting said housing for limited up and down movement including fulcrum means transversely aligned with the inlet end of said housing, means within said housing for continuously positively moving said material lengthwise thereof from said inlet toward said outlet at a uniform rate, means for continuously weighing the material in said housing comprising a scalebeam and means connecting said housing between said inlet and said outlet with said scalebeam, and means for varying the rate of said feeding means comprising a member having a position responsive to the position of said scalebeam.

5. In a feeding device a hopper, a horizontally elongated open ended tubular housing providing an inlet in one end thereof and an outlet at the other end thereof, a horizontally extending stationary tubular housing having an open end flexibly connected with said first mentioned housing at said inlet end thereof and rigidly connected with said hopper, said first mentioned housing extending endwise from said stationary housing, a feed screw in said last mentioned housing feeding material endwise into said inlet, flexible mounting means at the outlet end of said first mentioned housing, means within said first mentioned housing for positively moving said material lengthwise thereof from said inlet toward said outlet at a uniform rate, means for continuously weighing the material in said first mentioned housing comprising a scalebeam and means connecting said first mentioned housing between the ends thereof with said scalebeam, and means controlling the rate of rotation of said feed screw responsive to the position of said scalebeam.

6. In a feeding device a hopper, a horizontally elongated open ended tubular housing providing an inlet at one end thereof and an outlet at the other end thereof, a horizontally extending tubular housing having an open end flexibly connected with said first mentioned housing at said inlet end thereof and rigidly connected with said hopper, a feed screw in said last mentioned housing, flexible mounting means at the outlet end of said first mentioned housing, a conveyor screw in said first mentioned housing for moving said material lengthwise thereof from said inlet toward said outlet, means for driving said last conveyor screw at a constant rate, means for continuously weighing the material in said first mentioned housing comprising a scalebeam and means connecting said first mentioned housing between the ends thereof with said scalebeam, and means controlling the rate of rotation of said feed screw responsive to the position of said scalebeam.

7. In a feeding device, a hopper, a tubular stationary housing connected at one end thereof with said hopper and open at the other end thereof, a tubular weighing housing extending endwise from said stationary housing and having an open inlet end flexibly connected with said other end of said stationary housing to receive material discharged from said other end of said stationary housing through said open inlet end, means for moving material from said hopper lengthwise of said stationary housing toward said other end thereof, said weighing housing being mounted to swing about a transverse axis at the end thereof connected with said stationary housing, a discharge outlet at the other end of said weighing housing, conveying means in said weighing housing for moving the material received from said stationary housing to said discharge outlet, and means for continuously weighing the material in said weighing housing.

8. In a feeding device, a hopper, a tubular stationary housing connected at one end thereof with said hopper and open at the other end thereof, a tubular weighing housing extending endwise from said stationary housing and having an open inlet end flexibly connected with said other end of said stationary housing to receive material discharged from said other end of said stationary housing through said open inlet end, means for moving material from said hopper lengthwise of said stationary housing toward said other end thereof, said weighing housing being mounted to swing about a transverse axis at the end thereof connected with said stationary housing, a discharge outlet at the other end of said weighing housing, conveying means operating at a constant speed in said weighing housing for moving the material received from said stationary housing to said discharge outlet, a flexible mounting for said weighing housing at the discharge outlet end thereof, and means for continuously weighing the material in said weighing housing.

9. In a feeding device, a hopper, a tubular, open ended, stationary housing connected at one open end thereof with said hopper, an open ended tubular weighing housing extending endwise from said stationary housing and flexibly connected at one open end thereof with the other open end of said stationary housing to receive material discharged from said other end of said stationary housing, means for moving material from said hopper lengthwise of said stationary housing toward said other end thereof, said weighing housing being mounted to swing about a transverse axis at the end thereof connected with said stationary housing, a discharge outlet at the other end of said weighing housing, conveying means in said weighing housing for moving the material received from said stationary housing to said discharge outlet, a flexible mounting for said weighing housing at the discharge outlet end thereof, and means for continuously weighing the material in said weighing housing comprising a scalebeam and means between the inlet and outlet of said weighing housing connecting the same with said scalebeam.

10. In a feeding device, a hopper, a tubular, open ended, stationary housing connected at one open end thereof with said hopper, an open ended tubular weighing housing extending endwise from said stationary housing and flexibly connected at one open end thereof with the other open end of said stationary housing to receive material discharged from said other end of said stationary housing, means for moving material from said hopper lengthwise of said stationary housing toward said other end thereof at a variable rate, said weighing housing being mounted to swing about a transverse axis at the end thereof connected with said stationary housing, a discharge outlet at the other end of said weighing housing, conveying means in said weighing housing for moving the material received from said stationary housing to said discharge outlet, means for continuously weighing the material in said weighing housing, and means controlling the rate of feed of the means for moving said material lengthwise of said stationary housing actuated by said weighing means.

11. In a feeding device, a hopper, a tubular, horizontally extending, stationary housing connected at one end thereof with said hopper and open at the other end thereof, a tubular weighing housing extending endwise from and having an open end flexibly connected with said other end of said stationary housing to receive material discharged from said other end of said stationary housing through said open end thereof, a conveyor extending lengthwise of said stationary housing for positively moving material from said hopper lengthwise of said stationary housing toward said other end thereof, said weighing housing being mounted to swing about a transverse axis at the end thereof connected with said stationary housing, a discharge outlet at the other end of said weighing housing, conveying means extending lengthwise in said weighing housing for positively moving the material received from said stationary housing to said discharge outlet at a uniform rate, a flexible mounting for said weighing housing at the discharge outlet end thereof, and means for continuously weighing the material in said weighing housing.

12. In a feeding device, a hopper, a tubular, horizontally extending, stationary housing connected at one end thereof with said hopper and open at the other end thereof, a tubular weighing housing extending endwise from and having an open end flexibly connected with said other end of said stationary housing to receive material discharged from said other end of said stationary housing through said open end thereof, a conveyor extending lengthwise of said stationary housing to said other end thereof for moving material from said hopper lengthwise of said stationary housing toward said other end thereof, means for varying the speed of said conveyor, said weighing housing being mounted to swing about a transverse axis at the end thereof connected with said stationary housing, a discharge outlet at the other end of said weighing housing, conveying means extending lengthwise in said weighing housing from said open end to its discharge end for moving the material received from said stationary housing to said discharge outlet, a flexible mounting for said weighing housing at the discharge outlet end thereof, means for continuously weighing the material contained in said weighing housing, and means responsive to said weighing means for adjusting said speed varying means.

13. In a feeding device, a hopper, a tubular, horizontally extending, open ended, stationary housing connected at one open end thereof with said hopper, an open ended tubular weighing housing extending endwise from and being flexibly connected at one open end thereof with the other open end of said stationary housing to receive material discharged from said other end of said stationary housing, a conveyor screw mounted lengthwise in said stationary housing and extending into said hopper, said screw rotating to move material from said hopper through said one end of and lengthwise of said stationary housing toward said other end thereof, said weighing housing being mounted to swing about a transverse axis at the end thereof connected with said stationary housing, a discharge outlet at the other end of said weighing housing, a conveyor screw mounted lengthwise in said weighing housing, said last mentioned conveyor screw rotating to move the material received from said stationary housing to said discharge outlet, a flexible mounting for said weighing housing at the discharge outlet end thereof, and means for continuously weighing the material in said weighing housing.

14. In a feeding device, a hopper, a tubular, horizontally extending, open ended, stationary housing connected at one open end thereof with said hopper, an open ended tubular weighing housing extending endwise from and being flexibly connected at one open end thereof with the other open end of said stationary housing to receive material discharged from said other end of said stationary housing, a conveyor screw mounted lengthwise in said stationary housing and extending into said hopper, said screw rotating to move material from said hopper through said one end of and lengthwise of said stationary housing toward said other end thereof, means for varying the rate of rotation of said conveyor screw, said weighing housing being mounted to swing about a transverse axis at the end thereof connected with said stationary housing, a discharge outlet at the other end of said weighing housing, a conveyor screw mounted lengthwise in said weighing housing, said last mentioned conveyor screw rotating at a constant speed to move the material received from said stationary housing to said discharge outlet, a flexible mounting for said weighing housing at the discharge outlet end thereof, and means for continuously weighing the material in said weighing housing.

15. In a feeding device, a hopper, a tubular, horizontally extending, open ended, stationary housing connected at one open end thereof with said hopper, an open ended tubular weighing housing extending endwise from and being flexibly connected at one open end thereof with the other open end of said stationary housing to receive material discharged from said other end of said stationary housing, a conveyor screw mounted lengthwise in said stationary housing and extending into said hopper, said screw rotating to move material from said hopper through said one end of and lengthwise of said stationary housing toward said other end thereof, means for varying the rate of rotation of said conveyor screw, said weighing housing being mounted to swing about a transverse axis at the end thereof connected with said stationary housing, a discharge outlet at the other end of said weighing housing, a conveyor screw mounted lengthwise in said weighing housing, said last mentioned conveyor screw rotating at a constant speed to move the material received from said stationary housing to said discharge outlet, a flexible mounting for said weighing housing at the discharge outlet end thereof, and means for continuously weighing the material in said weighing housing, said means for varying the rate of rotation of said first mentioned conveyor screw being responsive to said weighing means.

16. In a feeding device, a hopper, a tubular stationary housing connected at one end thereof with said hopper, the other end thereof being open, a tubular weighing housing having an open end flexibly connected with the other end of said stationary housing to receive material discharged from said other end of said stationary housing, a conveyor screw mounted lengthwise in said stationary housing and extending into said hopper, said screw rotating to move material from said hopper lengthwise of said stationary housing toward and through said other end thereof, means for varying the rate of rotation of said conveyor screw, said weighing housing being mounted to swing about a transverse axis at the end thereof connected with said stationary housing, a discharge outlet at the other end of said weighing housing, a conveyor screw mounted lengthwise in said weighing housing, said last mentioned conveyor screw rotating at a constant speed to move the material received from said stationary housing to said discharge outlet, a flexible mounting for said weighing housing at the discharge outlet end thereof, and means for continuously weighing the material in said weighing housing comprising a scalebeam and means for supporting said weighing housing between said open end and said outlet end thereof from said scalebeam, said means for varying the rate of rotation of said first mentioned conveyor screw being responsive to the position of said scalebeam.

17. In a feeding device, a hopper, a tubular, horizontally extending, stationary housing having open ends and connected at one end thereof with said hopper, a tubular weighing housing having open ends, extending lengthwise from said stationary housing and flexibly connected at one end thereof with the other end of said stationary housing to receive material discharged from said other end of said stationary housing, a conveyor screw mounted lengthwise in said stationary housing and extending from said other end thereof into said hopper, said screw rotating to move material from said hopper lengthwise of said stationary housing toward said other end thereof, means for varying the rate of rotation of said conveyor screw, said weighing housing being mounted to swing about a transverse axis at the end thereof connected with said stationary housing, a discharge outlet at the other end of said weighing housing, a conveyor screw mounted lengthwise in said weighing housing and extending from end to end thereof, said last mentioned conveyor screw rotating at a constant speed to move the material received from said stationary housing to said discharge outlet, a flexible mounting for said weighing housing at the discharge outlet end thereof, and means for continuously weighing the material in said weighing housing comprising a scalebeam and means for supporting said weighing housing from said scalebeam, said means for varying the rate of rotation of said first mentioned conveyor screw comprising a variable speed transmission and mechanical means for adjusting said transmission comprising a mechanical controlling device responsive to the position of said scalebeam.

References Cited in the file of this patent

UNITED STATES PATENTS

| 1,733,079 | Graves et al. | Oct. 22, 1929 |
| 2,047,203 | Henson | July 14, 1936 |
| 2,088,334 | Merchen | July 27, 1937 |
| 2,623,658 | Hohansen | Dec. 30, 1952 |
| 2,764,316 | Sylvest | Sept. 25, 1956 |

FOREIGN PATENTS

| 290,623 | Switzerland | Aug. 1, 1953 |